United States Patent Office 3,286,035

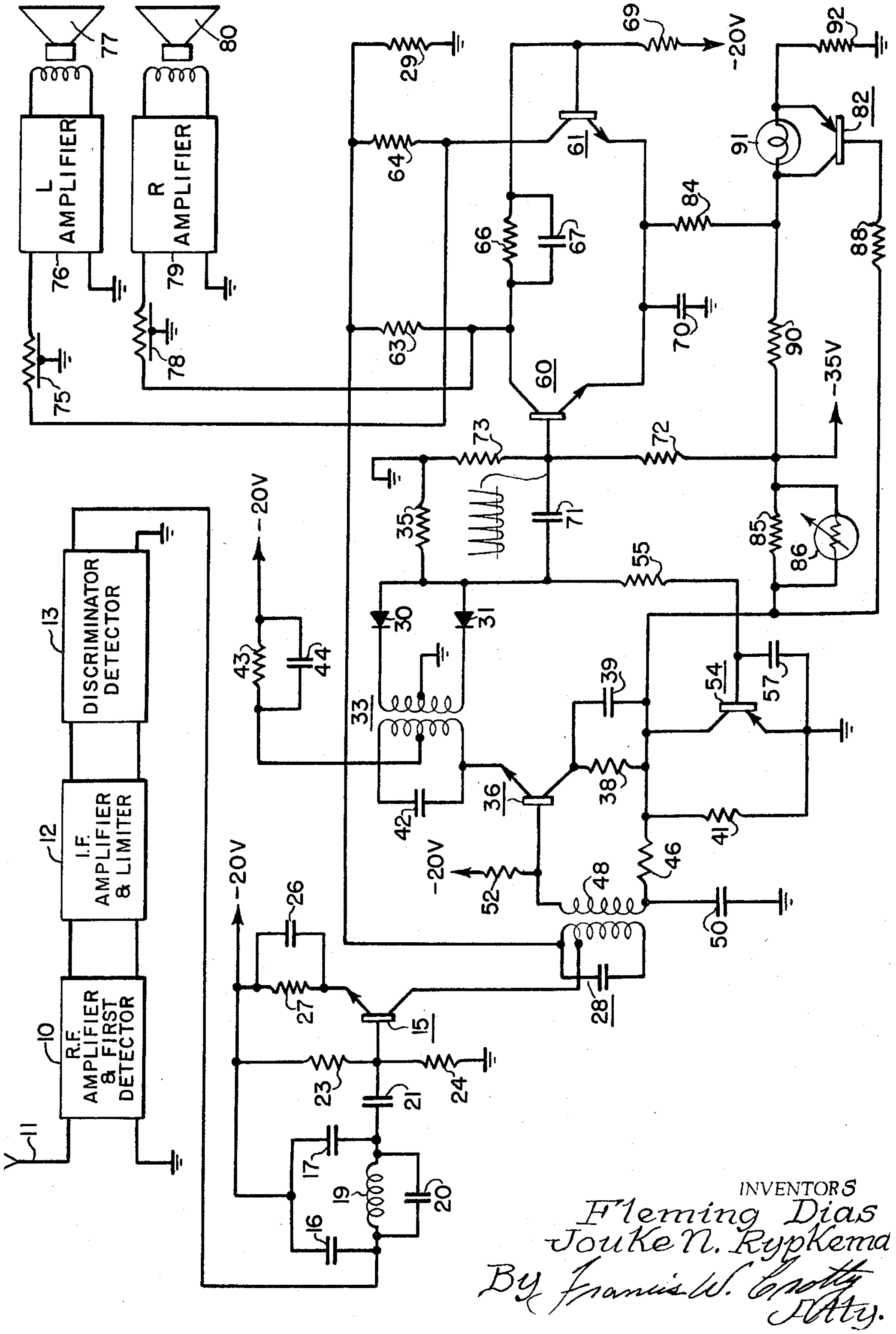
INVENTORS
Fleming Dias
JouKe N. Rypkema
By Francis W. Crotty
Atty.

Patented Nov. 15, 1966

3,286,035

MULTIVIBRATOR DETECTOR FOR STEREOPHONIC FREQUENCY MODULATION RECEIVERS

Fleming Dias, Chicago, and Jouke N. Rypkema, Villa Park, Ill., assignors to Zenith Radio Corporation, Chicago, Ill., a corporation of Delaware Filed Sept. 24, 1964, Ser. No. 398,950

11 Claims. (Cl. 179—15)

This invention relates generally to wave signal receivers for operation in response to either monophonic or stereophonic signal information transmitted on a single modulated carrier wave. Specifically, the invention is directed to the stereo detector of such a receiver.

A stereophonic broadcast, in accordance with the specifications of the Federal Communications Commission, comprises a carrier wave frequency modulated by the sum of two audio signals, such as stereophonically related left (L) and right (R) signals, as a single modulating signal in the usual manner of FM broadcasting. This causes the broadcast to be compatible since this component may be received and utilized by existing monaural receivers. In addition, the carrier wave is simultaneously modulated with the necessary information for effecting separation of the two audio signals, this being in the form of a subcarrier signal which is suppressed-carrier amplitude modulated with the difference of the two audio signals. Finally, the transmission includes a pilot tone at one-half the frequency of the subcarrier for use in demodulating the suppressed-carrier modulated signal.

To date a number of multi-mode receivers have been proposed for utilizing monophonic and stereophonic broadcasts. For instance, application serial No. 22,926, filed April 18, 1960, in the name of Robert Adler et al. and Patent No. 3,133,993, issued May 19, 1964, in the name of Adrian J. DeVries both of which are assigned to the assignee of the present invention, discuss the fundamental precepts of such reception, while disclosing and claiming basic means for demodulating the broadcasts.

It is an object of the present invention to provide a new and improved detector circuit useful in the reception of FM stereophonic signals.

It is another object of this invention to provide a novel subcarrier detector for stereophonic receivers which features a novel use of the pilot tone directly in the demodulation of the subcarrier sidebands.

It is still a further object of this invention to provide a novel detector circuit which exhibits excellent noise immunity and which is especially well-suited for integrated circuit design.

Accordingly, the invention is directed to a receiver for using a stereophonic program comprising a carrier frequency modulated in accordance with the sum of two audio signals, a subcarrier signal which has been suppressed-carrier amplitude-modulated with the difference of the two audio signals, and a pilot signal subharmonically related to the subcarrier signal. In a preferred embodiment of the invention, the receiver comprises a frequency modulation detector responsive to the carrier for deriving a composite signal representing the modulation of the carrier and a multivibrator including a pair of cross-coupled active devices individually having an electrode system including an electrode for controlling conduction in the device and further having a load circuit. Means are provided for applying at least the modulated suppressed-carrier component of the composite signal to the devices of the multivibrator, while other means responsive to the pilot tone develop and concurrently apply a demodulation signal to the control electrode of at least one of the devices to effect conduction in the devices of the multivibrator in alternation and at the frequency of the subcarrier to develop on each of the load circuits opposite phase signals representative of the modulation components of the subcarrier. In a further aspect of the invention, means are provided for rendering both of the devices of the multivibrator non-conductive in the absence of the pilot signal.

The features of the present invention which are believed to be novel are set forth with particularity in the appended claims. The invention, together with further objects and advantages thereof, may best be understood by reference to the following description taken in connection with the accompanying drawing, the single figure of which is a schematic representation of a frequency modulation receiver embodying a preferred form of the detector circuit of the invention.

The illustrated receiver is capable of two distinctly different modes of operation and adjusts itself automatically between these modes in accordance with the character of the received signal. More particularly, the receiver may be employed for the reception of a frequency modulation broadcast whether it be of the monophonic or stereophonic type and those portions of the receiver that are uniquely required for stereo are activated only during the reception of the stereophonic broadcast signal.

The arrangement of FIGURE 1 comprises receiver circuits, which, at least up to the discriminator-detector, are conventional. They include a radio-frequency amplifier of any desired number of stages and a heterodyning stage or first detector, both being represented by block 10. The input of the amplifying portion connects with a wave-signal antenna 11 and the output is coupled to a unit 12 which may include the usual stages of intermediate frequency amplification and one or more amplitude limiters. Following the IF amplifier and limiter 12 is a frequency modulation detector 13 responsive to the amplitude-limited IF signal for deriving an output signal representing the modulation of the received carrier. Second detector 13 may be of any well-known construction, but since a high degree of amplitude limiting is desirable, it is preferable that this unit be a ratio detector.

The output signal developed in the load circuit of detector 13 is supplied to a pilot tone amplifier chain through a trap circuit having components selected to reject a subcarrier frequency of 67 kc. over which authorized subscribers may receive background music or similar program material. A pilot tone amplifier chain, similar to that to be described herein, is disclosed and claimed in a copending application in the name of Jouke Rypkema, Serial No. 398,949, filed September 24, 1964 and assigned to the same assignee as the present invention. The trap circuit comprises shunt capacitors 16 and 17 and a series arm including an inductor 19 in parallel with a capacitor 20. The trap is coupled to the base electrode of a first amplifying transistor 15 of the pilot chain by a D.C. blocking capacitor 21. A pair of voltage divider resistors 23 and 24, series connected between a negative bias potential designated —20 v. and ground, have their junction coupled to the base electrode of transistor 15 to effect a proper operating bias for the device. The emitter of the transistor is returned to —20 v. through a resistor 27 bypassed by a capacitor 26 whose function will subsequently be explained. The collector circuit comprises a resonant impedance 28, which is tuned to the pilot tone of a stereophonic broadcast, in series with a resistor 29 which is coupled to ground.

Since the difference information in the stereophonic program is conveyed by way of suppressed-carrier amplitude-modulation, it is necessary to develop a synchronous demodulation component at the receiver and, therefore, the pilot tone amplifier chain to be described has a signal source which is responsive to the pilot tone of a received stereophonic program for developing a demodulation signal. As shown, this demodulation signal source comprises a pair of diodes 30, 31 the cathodes of which are coupled to the opposite terminals of the secondary winding of a transformer 33. The center tap of the secondary winding is grounded and the anodes of the diodes connect to ground through a load resistor 35.

The demodulation signal source, illustrated as a full-wave rectifier, is driven by the pilot tone through a variable gain transistor amplifier 36 which couples the rectifying means to input amplifier 15 and frequency modulation detector 13. The emitter circuit of amplifier 36 includes a low resistance 38 in parallel with a bypass capacitor 39 and coupled to ground through a high impedance resistor 41. The collector circuit of transistor 36 includes the primary of transformer 33 tuned to the pilot tone by a capacitor 42 and connected through a resistor 43 and a pilot tone bypass capacitor 44 to a source of operating potential designated —20 v. The emitter-base circuit of transistor 36 includes in addition to network 38, 39, a resistor 46 in series with an inductor 48 which as shown by the dashed line is inductively coupled to tuned tank circuit 28 of amplifier 15. In practice, the coil of tank circuit 28 and inductor 48 may constitute the primary and secondary windings of a transformer. The junction of resistor 46 and coil 48 is coupled to ground by a pilot tone bypass capacitor 50. The base of transistor 36 is coupled to voltage source —20 v. through a high impedance 52.

The quiescent bias potentials applied to transistor 36 in conjunction with the high impedance elements 41 and 46 in its emitter circuit establish, in the absence of a pilot signal, an operating condition of low gain; however, it is essential to have the transistor exhibit high gain during stereophonic reproduction. This is accomplished by a feedback network which includes a transistor 54, for effectively reducing the impedance of the emitter-base circuit of transistor 36 to increase its gain during stereophonic reception. Specifically, the feedback circuit includes load resistor 35 across which a potential of negative polarity is developed during operative intervals of the demodulation signal developing means 30, 31. The high-potential terminal of resistor 35 connects through a resistor 55 to the base electrode of transistor 54. A shunt capacitor 57 forms, in conjunction with resistor 55, a filter network for applying a substantially D.C. potential from rectifiers 30, 31 to the base of transistor 54. The collector and emitter electrodes of transistor 54 are connected directly in shunt to the parallel combination of high impedance 41 and series elements 46, 50 in the emitter circuit of transistor 36. Transistor 54 is normally nonconductive but may be rendered conductive in response to the reception of a pilot tone.

The demodulation signal derived at the output of rectifiers 30, 31 is used in the novel detector circuit of the invention to effect demodulation of the stereophonic program signal. As shown, the detector comprises a multivibrator including a pair of cross-coupled active devices 60 and 61 individually having an electrode system including an electrode for controlling conduction in the device and further having a load circuit. More specifically, the individual load circuits of the multivibrator initiate from the collector electrodes of transistor 60 and 61 and are connected through similar load impedances 63 and 64, respectively, to a common collector load resistor 29 which is returned to ground. A resistor 66 bypassed by a commutating capacitor 67 provides cross-coupling between the collector electrode of transistor 60 and the base electrode of transistor 61. The base electrode of transistor 61 is also connected to a source of bias potential —20 v. through a resistor 69. The emitter electrodes of the transistors are coupled directly in common and returned to ground through an audio bypass capacitor 70.

In accordance with the invention, the demodulation signal is applied to the control electrode of at least one of the devices of the multivibrator to effect conduction in the devices in alternation and at the frequency of the subcarrier. Because the preferred embodiment employs a multivibrator of the monostable variety, the demodulation signal is the full-wave rectified pilot tone developed across load resistor 35 and is applied to the base electrode of only a particular one of the transistors. Thus, the demodulation signal source 30, 31 is directly coupled to the base electrode of transistor 60 through a coupling capacitor 71. The base of transistor 60 also receives an operating bias from the junction of a voltage divider comprising series connected resistors 72 and 73 extending from source —35 v. to ground.

Demodulation of the stereophonic program information is accomplished by applying, concurrently with the demodulation signal, at least the modulated suppressed-carrier component of the composite stereo signal to the transistors of the multivibrator. To that end, the collector circuit of input amplifier 15 connects to the collectors of transistors 60, 61 through resistors 63, 64 respectively. The detected audio signal at the collector of transistor 61 is coupled through an RC de-emphasis network 75 to the input of an "L" amplifier 76 which drives a loudspeaker 77. Similarly, the output taken from the collector of transistor 60 is supplied through de-emphasis network 78 to an "R" amplifier 79 driving a second loudspeaker 80, the speakers, of course, being arranged spacially to produce a stereophonic sound pattern.

As will presently be explained, during monophonic reception it is desirable that the transistors 60, 61 be rendered nonconductive. For this reason means are coupled to the multivibrator for rendering both transistors nonconductive, but only in the absence of the pilot signal. This means comprises a control network including a transistor 82 for developing a control potential at its collector electrode of a first value during reception of a monophonic signal and of a second, substantially different value, during reception of a stereophonic signal. More particularly, a low impedance 84 coupled from the collector of transistor 82 to the common emitter connection of multivibrator transistors 60, 61 is provided for applying the control potential to the individual devices of the multivibrator. This control voltage is derived from a voltage divider network comprising a resistor 90, a stereo indicator lamp 91 shunted by transistor 82, and a resistor 92 coupled from source —35 v. to ground. During a monophonic program transistor 82 is conductive to shunt lamp 91. In stereo reception, the transistor is rendered nonconductive, and the resultant current in the indicator lamp provides visual notice of a stereophonic program and a substantial potential change at the collector of transistor 82 to effect the desired control. Conduction of transistor 82 is governed by a second voltage divider network comprising a parallel combination of a resistor 85 and a thermistor 86, the latter compensating for temperature induced component variations in the circuit, and series resistor 41 coupled from source —35 v. to ground. The common junction of these elements is connected by a resistor 88 to the base electrode of transistor 82.

Control and indicator claimed networks similar to that just described are illustrated and claimed in a copending application of Fleming Dias et al., filed September 24, 1964, Serial No. 398,948, and assigned to the same assignee as the present invention.

In considering the operation of the receiver, it will be assumed initially that a monaural program is being received and, therefore, the pilot amplifier chain is in its quiescent state. As previously mentioned, the gain of pilot amplifier transistor 36 is a function of the effective A.C. impedance of its emitter circuit and, therefore, in this quiescent state the transistor exhibits low gain because of impedances 41 and 46. The low gain characteristic is preferable as it substantially prevents false actuation or triggering of the pilot chain in response to noise, particularly noise that may reach amplifier 15 as the receiver is tuned over its band.

In addition, during this quiescent state a substantial negative potential is present at the base of transistor 82 as a result of voltage divider 85, 41. As a consequence, transistor 82 is rendered heavily conductive and indicator lamp 91 is de-energized. The control potential supplied to the common junction of the emitters of multivibrator transistors 60, 61 for this condition biases both transistors to a nonconductive state.

The received monaural signal is translated in conventional fashion from receiving antenna 11 to detector 13 wherein its modulation components are derived. The detected modulation signal components after amplification by transistor 15, are applied through tuned circuit 28, which is a low impedance to audio, to load impedance 29 and by load resistors 63, 64 to the collector electrodes of multivibrator transistors 60, 61. Since both transistors are in their nonconductive or high impedance states, the audio information is coupled through de-emphasis networks 75 and 78 to amplifiers 76 and 79, and thence to loudspeakers 77 and 80, respectively. This results in conventional dual speaker monaural signal reproduction and while it's taking place, the pilot chain of the receiver remains in its quiescent condition. If during monaural reception either of the multivibrator transistors were conductive, as is consonant with conventional multivibrator operation, the audio signal to the associated speaker would be substantially attenuated as a result of the low impedance shunt path through the conductive transistor and audio bypass capacitor 70 to ground. This undesirable condition is avoided by applying, in accordance with one aspect of the invention, a control potential to the emitter electrodes of these transistors to bias them both to a nonconductive state in the absence of a pilot signal.

If the received program is a FM stereophonic broadcast, the output of detector 13 corresponds to the composite modulation signal of that broadcast. This output signal is again translated by input transistor 15 except that the pilot tone is selected by tuned circuit 28 and applied to variable gain amplifier 36. There is sufficient gain in this amplifier to translate the 19 kc. tone through transformer 33 to diodes 30, 31 resulting in a full-wave rectified signal of negative polarity developed across resistor 45. This signal is filtered by network 55, 57 to apply a substantailly D.C. signal to the base of transistor 54 to bias the transistor to a conductive state. Conduction of transistor 54, since it is in shunt relation to impedances 41 and 46, effectively reduces the emitter A.C. impedance of transistor 36 thereby increasing its gain. This regenerative feedback continues until transistor 54 is saturated and transistor 36 achieves high gain.

At the time the pilot tone is actually received, there is a net forward bias on the base electrode of transistor 82 because of the potential developed at the junction of voltage divider resistors 85, 41. When transistor switch 54 becomes saturated, an essentially ground potential appears at this junction and transistor 82 is rendered nonconductive. The current previously shunted by transistor 82 is now directed through indicator lamp 91 to give a visual indication of stereo reception. Also, as lamp 91 adds considerable impedance to the series voltage divider network comprising resistors 90 and 92, the D.C. voltage at the junction of elements 90, 91 is substantially changed. The new potential level biases devices 60, 61 of the multivibrator for operation.

In accordance with the invention, a multivibrator is employed to effect demodulation of the suppressed carrier amplitude modulated subcarrier signal conveying the required difference information of the two audio signals. In the illustrated preferred embodiment, the multivibrator is of the monostable variety, specifically, a Schmitt trigger circuit is employed. The Schmitt trigger circuit offers several distinct advantages as the subcarrier detector and therefore its operation will be discussed.

Assuming the requisite bias to have been applied through resistor 84 to the emitter electrodes of the multivibrator transistors, transistor 61 is in a saturated on condition and transistor 60 is nonconductive. In conformity with conventional monostable multivibrator operation a signal of an appropriate value at the base of transistor 60 initiates conduction therein while simultaneously biasing transistor 61 to an off condition through coupling network 66, 67. For the case at hand, the demodulation signal, is the full-wave rectified pilot signal sketched on the accompanying figure adjacent transistor 60. This signal is derived across load resistor 35 and applied through capacitor 71 to the base of transistor 60. The dashed line on the sketch represents the nominal operating bias at the base electrode of the transistor from voltage divider 72, 73 and a signal amplitude above the dashed line renders transistor 60 conductive. Proper adjustment of this bias allows the multivibrator transistors to be on during one-half the period of the demodulation signal and off during the other half, establishing a desired 50–50 duty cycle.

Concurrently with the application of the demodulation signal to transistor 60 the suppressed subcarrier component of the composite stereo signal is supplied to the collector electrodes of active devices 60, 61 of the multivibrator. During the conduction interval of either transistor a signal at its collector electrode is shunted through the transistor and audio bypass capacitor 70 to ground. During periods of nonconduction, however, the transistor represents an open circuit from collector-emitter to ground. Therefore, in effect, the signals at the respective collector electrodes of transistors 60 and 61 are multiplied at a 38 kc. rate by phase opposed signals alternately having a magnitude of 1 and 0 to develop in each of the load circuits opposite phase signals representative of the modulation components of the subcarrier. More particularly, a $(L-R)$ signal is developed in load circuit 63 and a $(L-R)$ signal is developed in load circuit 64. The basic theory of detection by such synchronous switching methods is adequately discussed and illustrative embodiments claimed in DeVries Patent No. 3,133,993, issued May 19, 1964, and in an application of DeVries et al., Serial No. 148,234, filed October 27, 1961, and assigned to the assignee of this invention. It, therefore, need not be repeated here.

The illustrated demodulation circuit offers excellent immunity to noise. This is true as during the conduction period of each transistor it is in a saturated on condition and, therefore, normally incurred noise is not of a sufficient magnitude to in any way affect its conduction characteristics. Moreover, the rectified 19 kc. pilot tone is directly employed in the demodulation of the subcarrier sidebands, avoiding the need for additional circuit elements tuned to twice the pilot frequency as featured in previous pilot chain arrangements. Elimination of these components facilitates fabrication of the circuitry by integrated circuit techniques.

By presenting the $(L+R)$ or main channel modulation of the composite signal in proper amplitude to each of the load circuits 63, 64 matrixing is accomplished. In other words, one of the audio signals is recovered substantially separated from the other in each of the load circuits. Capacitor 28 and resistor 27 in the emitter circuit of transistor 15 are provided to attenuate the main channel signal relative to the suppressed-carrier-modulated subcarrier to effect the desired amplitude relation between the sum and difference information prior to matrixing in load resistors 63, 64. However, it will be recognized that matrixing may be done in other well-known manners.

By way of illustration but in no sense by way of limitation, the following component values have been used in the amplitude-modulation detector of FIGURE 1;

| | |
|---|---|
| Transistor **15** | 2N1302 |
| Transistor **36** | 2N1303 |
| Transistor **54** | 2N1303 |
| Transistor **60** | 2N1302 |
| Transistor **61** | 2N1302 |

| | |
|---|---|
| Transistor **82** | 2N1303 |
| Capacitor **16**, micromicrofarads | 1200 |
| Capacitor **17**, micromicrofarads | 1200 |
| Capacitor **20**, micromicrofarads | 510 |
| Capacitor **21**, microfarads | 2 |
| Capacitor **26**, microfarad | .015 |
| Capacitor of tuned circuit **28**, micromicrofarads | 680 |
| Capacitor **39**, microfarad | 1 |
| Capacitor **42**, micromicrofarads | 680 |
| Capacitor **44**, microfarad | 1 |
| Capacitor **50**, microfarad | 1 |
| Capacitor **57**, microfarad | .33 |
| Capacitor **67**, micromicrofarads | 200 |
| Capacitor **70**, microfarads | 10 |
| Capacitor **71**, micromicrofarads | 6800 |
| Inductor **19**, millihenries | 10 |
| Resistor **23**, ohms | 10,000 |
| Resistor **24**, ohms | 100,000 |
| Resistor **27**, ohms | 330 |
| Resistor **29**, ohms | 2200 |
| Resistor **35**, ohms | 8200 |
| Resistor **38**, ohms | 100 |
| Resistor **41**, ohms | 10,000 |
| Resistor **43**, ohms | 6800 |
| Resistor **46**, ohms | 1500 |
| Resistor **52**, ohms | 150,000 |
| Resistor **55**, ohms | 4700 |
| Resistor **60**, ohms | 3300 |
| Resistor **64**, ohms | 3300 |
| Resistor **66**, ohms | 22,000 |
| Resistor **69**, ohms | 6800 |
| Resistor **72**, ohms | 47,000 |
| Resistor **73**, ohms | 50,000 |
| Resistor **84**, ohms | 100 |
| Resistor **85**, ohms | 22,000 |
| Resistor **88**, ohms | 4700 |
| Resistor **90**, ohms | 1000 |
| Resistor **92**, ohms | 100 |

Thus, the detector of the invention permits a novel use of the received pilot signal to demodulate the subcarrier components and avoids costly resonant circuits tuned to twice the pilot frequency. Also the normally conductive transistor in the multivibrator of the multi-mode detector is rendered nonconductive in the absence of a stereophonic signal to allow normal or balanced dual speaker reception of monophonic program signals. Finally the circuit of the invention has been shown to provide excellent immunity to noise which may be present in the pilot amplifier chain.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A receiver for using a stereophonic program comprising a carrier frequency-modulated in accordance with the sum of two audio signals, a subcarrier signal which has been suppressed-carrier amplitude-modulated with the difference of said two audio signals, and a pilot signal subharmonically related to said subcarrier signal, said receiver comprising:

a frequency-modulation detector responsive to said carrier for deriving a composite signal representing the modulation of said carrier;

a multivibrator including a pair of cross-coupled active devices individually having an electrode system including an electrode for controlling conduction in the device and further having a load circuit;

means responsive to said pilot tone for developing a demodulation signal;

means for concurrently applying at least the modulated suppressed-carrier component of said composite signal to said devices of said multivibrator;

and means for applying said demodulation signal to the control electrode of at least one of said devices to effect conduction in said devices of said multivibrator in alternation and at the frequency of said subcarrier to develop in each of said load circuits opposite phase signals representative of the modulation components of said subcarrier.

2. A receiver for using a stereophonic program comprising a carrier frequency-modulated in accordance with the sum of two audio signals, a subcarrier signal which has been suppressed-carrier amplitude-modulated with the difference of said two audio signals, and a pilot signal subharmonically related to said subcarrier signal, said receiver comprising:

a frequency-modulation detector responsive to said carrier for deriving a composite signal representing the modulation of said carrier;

a multivibrator including a pair of cross-coupled active devices individually having an electrode system including an electrode for controlling conduction in the device and further having a load circuit;

means responsive to said pilot tone for developing a demodulation signal;

means for concurrently applying said sum signal and said modulated suppressed-carrier components of said composite signal to said devices of said multivibrator;

and means for applying said demodulation signal to the control electrode of at least one of said devices to effect conduction in said devices of said multivibrator in alternation and at the frequency of said subcarrier to develop in each of said load circuits a respective one of said audio signals substantially separated from the other of said audio signals.

3. A receiver for using a stereophonic program comprising a carrier frequency-modulated in accordance with the sum of two audio signals, a subcarrier signal which has been suppressed-carrier amplitude-modulated with the difference of said two audio signals, and a pilot signal subharmonically related to said subcarrier signal, said receiver comprising:

a frequency-modulation detector responsive to said carrier for deriving a composite signal representing the modulation of said carrier;

a multivibrator including a pair of cross-coupled active devices individually having an electrode system including an electrode for controlling conduction in the device and further having a load circuit;

means coupled to said frequency modulation detector for full-wave rectifying said pilot signal;

means for concurrently applying said sum signal and said modulated suppressed-carrier components of said composite signal to said devices of said multivibrator;

and means for applying said rectified pilot signal to the control electrode of at least one of said devices to effect conduction in said devices of said multivibrator in alternation and at the frequency of said subcarrier to develop in each of said load circuits a respective one of said audio signals substantially separated from the other of said audio signals.

4. A receiver for using a stereophonic program comprising a carrier frequency-modulated in accordance with the sum of two audio signals, a subcarrier signal which has been suppressed-carrier amplitude-modulated with the difference of said two audio signals, and a pilot signal subharmonically related to said subcarrier signal, said receiver comprising:

a frequency-modulation detector responsive to said carrier for deriving a composite signal representing the modulation of said carrier;

a monostable multivibrator including a pair of non-symmetrically cross-coupled active devices individually having an electrode system including an electrode for controlling conduction in the device and further having a load circuit;

means coupled to said frequency modulation detector for rectifying said pilot signal;

means for concurrently applying said sum signal and the modulated suppressed-carrier components of said composite signal to said devices of said monostable multivibrator;

and means for applying said demodulation signal to the control electrode of one of said devices to effect conduction in said devices of said monostable multivibrator in alternation and at the frequency of said subcarrier to develop in each of said load circuits a respective one of said audio signals substantially separated from the other of said audio signals.

5. A receiver for using a stereophonic program comprising a carrier frequency-modulated in accordance with the sum of two audio signals, a subcarrier signal which has been suppressed-carrier amplitude-modulated with the difference of said two audio signals, and a pilot signal subharmonically related to said subcarrier signal, said receiver comprising:

a frequency-modulation detector responsive to said carrier for deriving a composite signal representing the modulation of said carrier;

a monostable multivibrator including a pair of non-symmetrically cross-coupled transistors each of said transistors having an electrode system including an electrode for controlling conduction in the transistor and further having a load circuit;

means including a full-wave rectifying device coupled to said frequency modulation detector for developing a demodulation signal;

means for concurrently applying said sum signal and the modulated suppressed-carrier components of said composite signal to said transistors of said monostable multivibrator;

and means for applying said demodulation signal to the control electrode of one of said transistors to effect conduction in said devices of said monostable multivibrator in alternation and at the frequency of said subcarrier to develop in each of said load circuits a respective one of said audio signals substantially separated from the other of said audio signals.

6. A receiver for selectively using a frequency modulated monophonic signal or a stereophonic signal comprising a carrier frequency-modulated in accordance with the sum of two audio signals, a subcarrier signal which has been suppressed-carrier amplitude-modulated with the difference of said two audio signals, and a pilot signal subharmonically related to said subcarrier signal, said receiver comprising:

a frequency-modulation detector responsive to a received signal for deriving an output signal representing the modulation of the receiver signal;

a multivibrator including a pair of cross-coupled active devices individually having an electrode system including an electrode for controlling conduction in the device and further having a load circuit;

means coupled to said multivibrator for rendering both of said devices non-conductive only in the absence of said pilot signal;

means responsive to said pilot tone for developing a demodulation signal;

means for concurrently applying said output signal of said detector to said devices of said multivibrator;

and means for applying said demodulation signal to the control electrode of at least one of said devices to effect conduction in said devices of said multivibrator in alternation and at the frequency of said subcarrier to develop in each of said load circuits opposite phase signals representative of the modulation components of said subcarrier.

7. A receiver for selectively using a frequency modulated monophonic signal or a stereophonic signal comprising a carrier frequency-modulated in accordance with the sum of two audio signals, a subcarrier signal which has been suppressed-carrier amplitude-modulated with the difference of said two audio signals, and a pilot signal subharmonically related to said subcarrier signal, said receiver comprising:

a frequency-modulation detector responsive to a received signal for deriving an output signal representing the modulation of the received signal;

a Schmitt trigger circuit including a pair of cross-coupled active devices individually having an electrode system including an electrode for controlling conduction in the device and further having a load circuit;

means coupled to said Schmitt trigger circuit for rendering both of said devices non-conductive only in the absence of said pilot signal;

means responsive to said pilot tone for developing a demodulation signal;

means for concurrently applying said output signal of said detector to said devices of said Schmitt trigger circuit;

and means for applying said demodulation signal to the control electrode of one of said devices to effect conduction in said devices of said Schmitt trigger circuit in alternation and at the frequency of said subcarrier to develop in each of said load circuits opposite phase signals representative of the modulation components of said subcarrier.

8. A receiver for selectively using a frequency modulated monophonic signal or a stereophonic signal comprising a carrier frequency-modulated in accordance with the sum of two audio signals, a subcarrier signal which has been suppressed-carrier amplitude-modulated with the difference of said two audio signals, and a pilot signal subharmonically related to said subcarrier signal, said receiver comprising:

a frequency-modulation detector responsive to a received signal for deriving an output signal representing the modulation of the received signal;

a monostable multivibrator including a pair of cross-coupled active devices individually having an electrode system including an electrode for controlling conduction in the device and further having a load circuit;

means coupled to said monostable multivibrator for rendering both of said devices non-conductive only in the absence of said pilot signal;

means responsive to said pilot tone for developing a demodulation signal;

means for concurrently applying said output signal of said detector to said devices of said monostable multivibrator;

and means for applying said demodulation signal to the control electrode of one of said devices to effect conduction in said devices of said monostable multivibrator in alternation and at the frequency of said subcarrier to develop in each of said load circuits opposite phase signals representative of the modulation components of said subcarrier.

9. A receiver for selectively using a frequency modulated monophonic signal or a stereophonic signal comprising a carrier frequency-modulated in accordance with the sum of two audio signals, a subcarrier signal which has been suppressed-carrier amplitude-modulated with the difference of said two audio signals, and a pilot signal subharmonically related to said subcarrier signal, said receiver comprising:

a frequency-modulation detector responsive to a received signal for deriving an output signal representing the modulation of the received signal;

a multivibrator including a pair of cross-coupled active devices individually having an electrode system including an electrode for controlling conduction in the device and further having a load circuit one terminal of which is established at a reference potential during conduction intervals of its associated active device;

means coupled to said multivibrator for rendering both of said devices non-conductive only in the absence of said pilot signal;

means responsive to said pilot tone for developing a demodulation signal;

means for concurrently applying said output signal of said detector through said load circuits to said devices of said multivibrator;

means for applying said demodulation signal to the control electrode of at least one of said devices to effect conduction in said devices of said multivibrator in alternation and at the frequency of said subcarrier to develop at said one terminal of each of said load circuits opposite phase signals representative of the modulation components of said subcarrier;

and means for deriving output signals from said one terminal of each of said load circuits.

10. A receiver for selectively using a frequency modulated monophonic signal or a stereophonic signal comprising a carrier frequency-modulated in accordance with the sum of two audio signals, a subcarrier signal which has been suppressed-carrier amplitude-modulated with the difference of said two audio signals, and a pilot signal subharmonically related to said subcarrier signal, said receiver comprising:

a frequency-modulation detector responsive to a received signal for deriving an output signal representing the modulation of the received signal;

a multivibrator including a pair of cross-coupled active devices individually having an electrode system including an electrode for controlling conduction in the device and further having a load circuit;

a control network coupled to said detector for developing a control potential of a first value during reception of said monophonic signal and of a second, substantially different value, during reception of said stereophonic signal;

means for applying said control potential to said devices of said multivibrator to render both of said devices non-conductive during reception of said monophonic signal;

means responsive to said pilot tone for developing a demodulation signal;

means for concurrently applying said output signal of said detector to said devices of said multivibrator;

and means for applying said demodulation signal to the control electrode of at least one of said devices to effect conduction in said devices of said multivibrator in alternation and at the frequency of said subcarrier to develop in each of said load circuits opposite phase signals representative of the modulation components of said subcarrier,

11. A receiver for selectively using a frequency modulated monophonic signal or a stereophonic signal comprising a carrier frequency-modulated in accordance with the sum of two audio signals, a subcarrier signal which has been suppressed-carrier amplitude-modulated with the difference of said two audio signals, and a pilot signal subharmonically related to said subcarrier signal, said receiver comprising:

a frequency-modulation detector responsive to a received signal for deriving an output signal representing the modulation of the received signal;

a multivibrator including a pair of cross-coupled active devices individually having an electrode system including an electrode for controlling conduction in the device and further having a load circuit;

a control network coupled to said detector for developing control potential of a first value during reception of said monophonic signal and of a second, substantially different value, during reception of said stereophonic signal;

an indicator lamp included in said network and responsive to the translation of said pilot tone for providing a visual indication of the presence of said stereophonic signal;

means for applying said control potential to said devices of said multivibrator to render both of said devices non-conductive during reception of said monophonic signal;

means responsive to said pilot tone for developing a demodulation signal;

means for concurrently applying said output signal of said detector to said devices of said multivibrator;

and means for applying said demodulation signal to the control electrode of at least one of said devices to effect conduction in said devices of said multivibrator in alternation and at the frequency of said subcarrier to develop in each of said load circuits opposite phase signals representative of the modulation components of said subcarrier.

References Cited by the Examiner

UNITED STATES PATENTS

| | | | |
|---|---|---|---|
| 3,175,040 | 3/1965 | Von Recklinghausen | 179—15 |
| 3,176,075 | 3/1965 | Bially | 179—15 |

DAVID G. REDINBAUGH, *Primary Examiner.*

ROBERT L. GRIFFIN, *Examiner.*